US006036498A

United States Patent [19]

Kondo

[11] Patent Number: 6,036,498

[45] Date of Patent: Mar. 14, 2000

[54] KARAOKE APPARATUS WITH AURAL PROMPT OF WORDS

[75] Inventor: Takayasu Kondo, Hamamatsu, Japan

[73] Assignee: Yamaha Corporation, Hamamatsu, Japan

[21] Appl. No.: 09/103,516

[22] Filed: Jun. 23, 1998

[30] Foreign Application Priority Data

Jul. 2, 1997 [JP] Japan .................................... 9-176845

[51] Int. Cl.$^{7}$ ............................ G09B 15/02; G10H 1/36; H04N 5/78

[52] U.S. Cl. ................................ 434/307 A; 434/307 R; 84/609; 84/610

[58] Field of Search ................................ 434/307 R–309, 434/318, 365; 84/601, 609, 610, 477 R, 622, 634, 650, 600, 666; 348/18, 571, 595, 738, 748, 484, 569; 386/55; 375/326, 327

[56] References Cited

U.S. PATENT DOCUMENTS

| | | | |
|---|---|---|---|
| 5,365,576 | 11/1994 | Tsumura et al. | 348/16 X |
| 5,499,921 | 3/1996 | Sone | 434/307 A |
| 5,569,038 | 10/1996 | Tubman et al. | 434/308 |
| 5,604,771 | 2/1997 | Quiros | 375/326 |
| 5,770,811 | 6/1998 | Haino | 84/477 R X |
| 5,834,670 | 11/1998 | Yumura et al. | 84/610 |
| 5,844,158 | 12/1998 | Butler et al. | 84/650 |
| 5,863,206 | 1/1999 | Narusawa et al. | 434/307 A |

FOREIGN PATENT DOCUMENTS

| | | | |
|---|---|---|---|
| 5-142985 | 6/1993 | Japan | 434/307 A |

*Primary Examiner*—Joe H. Cheng
*Attorney, Agent, or Firm*—Pillsbury Madison & Sutro LLP

[57] ABSTRACT

A karaoke apparatus responds to a request for producing a karaoke music piece to accompany a live singing performance of words of the karaoke music piece by a karaoke player. In the karaoke apparatus, a storage device stores music data representing a plurality of karaoke music pieces and speech data representing speech sounds of words of the karaoke music pieces. An operation panel operates upon a request for designating a karaoke music piece to be performed. A tone generator retrieves the music data corresponding to the designated karaoke music piece from the storage device so as to generate music tones of the designated karaoke music piece to thereby accompany the live singing performance. A voice processor cooperates with the tone generator for retrieving the speech data corresponding to the designated karaoke music piece from the storage device so as to produce the speech sounds of the words of the designated karaoke music piece to thereby provide an aural prompt for the live singing performance of the words by the karaoke player.

12 Claims, 7 Drawing Sheets

FIG.2(A)
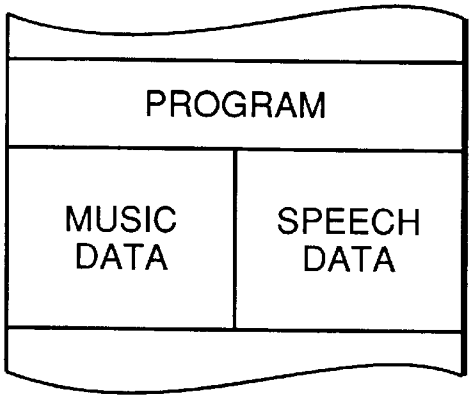
FIG.2(B)
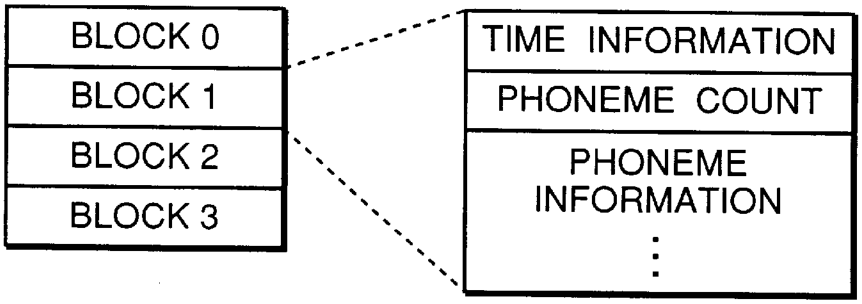
FIG.2(C)
| BLOCK | TIME INFORMATION | PHONEME COUNT | PHONEME INFORMATION |
|---|---|---|---|
| 0 | 10000 | 0 | |
| 1 | 1000 | 3 | I, RO, WA |
| 2 | 2000 | 4 | NI, O, E, DO |
| 3 | 1000 | 6 | CHI, RI, NU, RU, WO, 。 |
| 4 | 2000 | 3 | WA, GA, YO |
| 5 | 1000 | 3 | TA, RE, ZO |
| 6 | 2000 | 6 | TSU, NE, NA, RA, MU, 。 |

KARAOKE APPARATUS WITH AURAL PROMPT OF WORDS

BACKGROUND OF THE INVENTION

1. Field of the Invention

The present invention generally relates to a karaoke apparatus capable of aurally guiding a karaoke player along words of a karaoke music piece by speech sounds.

2. Description of Related Art

In conventional karaoke apparatuses, words of a karaoke music piece are generally displayed on a monitor screen for visually guiding a player of the karaoke music piece along its words.

However, the blind for example cannot read the words displayed on the monitor screen. Therefore, with the conventional karaoke apparatuses, the blind must learn words by heart to sing a karaoke music piece. In case that the conventional karaoke apparatus is used outdoors where use of a monitor is disabled, karaoke players cannot help but resort to word prompt cards. This is obviously more inconvenient for karaoke players than following the words that are automatically displayed on the monitor.

SUMMARY OF THE INVENTION

It is therefore an object of the present invention to provide a karaoke apparatus that guides karaoke players along words of a karaoke music piece by use of speech sounds, thereby allowing karaoke players to sing a song of which words are not fully or partially remembered by them.

The inventive karaoke apparatus is responsive to a request for producing a karaoke music piece to accompany a live singing performance of words of the karaoke music piece by a karaoke player. In the karaoke apparatus, first memory means is provided for memorizing music data representing a plurality of karaoke music pieces. Designating means is operative upon a request for designating a karaoke music piece to be performed. Producing means is provided for retrieving the music data corresponding to the designated karaoke music piece from the first memory means so as to generate music tones of the designated karaoke music piece to thereby accompany the live singing performance. Second memory means is provided for memorizing speech data representing speech sounds of words of the karaoke music pieces. Prompting means is cooperative with the producing means for retrieving the speech data corresponding to the designated karaoke music piece from the second memory means so as to produce the speech sounds of the words of the designated karaoke music piece to thereby provide an aural prompt for the live singing performance of the words by the karaoke player.

Preferably, the prompting means includes speed adjustment means for adjusting a speed of production of the speech sounds so as to customize the aural prompt for the karaoke player.

Preferably, the prompting means includes break adjustment means for adjusting a number of words that are spoken as a unit without break so as to customize the aural prompt for the karaoke player.

Preferably, the prompting means includes timing regulation means for timing the aural prompt in synchronization with a tempo of the produced karaoke music piece.

Preferably, the prompting means includes frequency regulation means for regulating a frequency of the speech sounds in matching with a pitch of the live singing performance.

In the present invention, the words are sounded in synchronization with performance of the karaoke music piece to aurally guide the player along the words of the karaoke music piece. Preferably, in the sounding of the words, the sounding speed of the words and the number of the sounding words that occur at a time without break are variable according to karaoke player's age, liking, familiarity with the performed karaoke music piece and so on. For example, if the number of words to be memorized by a karaoke player at a time is very small such as only one word in an extreme case, that one word must be pronounced immediately before that word is actually sung. On the contrary, if a karaoke player can memorize the entire words of a karaoke music piece or karaoke song, the entire words may be pronounced during the introduction part of that song in an extreme case. In this case, the words need not be pronounced during actual karaoke performance. These requirements can be met by use of the adjustment means for adjusting the number of words to be pronounced such that the maximum number of pronunciation words is set to one in the former case and to infinity in the later case. In addition, a karaoke player can adjust pronunciation speed or speech speed of the words by use of the speed adjustment means for adjusting the word pronunciation speed to a level optimum to his or her particular distinguishing capability. Further, the pronunciation speed of the words and the pitch or frequency of the pronounced words can be adjusted to a particular karaoke music piece to make the word guidance or aural prompt easy for a karaoke player to follow, thereby making the karaoke singing performance more enjoyable.

BRIEF DESCRIPTION OF THE DRAWIINGS

These and other objects of the invention will be seen by reference to the description, taken in connection with the accompanying drawings, in which:

FIG. 1 is a block diagram illustrating a karaoke apparatus practiced as one preferred embodiment of the present invention;

FIGS. 2(A), 2(B), and 2(C) are diagrams illustrating formats of speech data for use in the above-mentioned preferred embodiment;

FIGS. 3(A) and 3(B) are timing charts describing aural prompt operation in the above-mentioned preferred embodiment;

DETAILED DESCRIPTION OF PREFERRED EMBODIMENT

This invention will be described in further detail by way of example with reference to the accompanying drawings. A karaoke apparatus practiced as one preferred embodiment of the present invention displays, on a monitor screen, words of a karaoke music piece along live singing performance of the karaoke music piece. The inventive karaoke apparatus characterizingly provides a voice guide mode in which the words are sounded in units of phrase or block in preceding to the actual singing performance.

Figure 1:
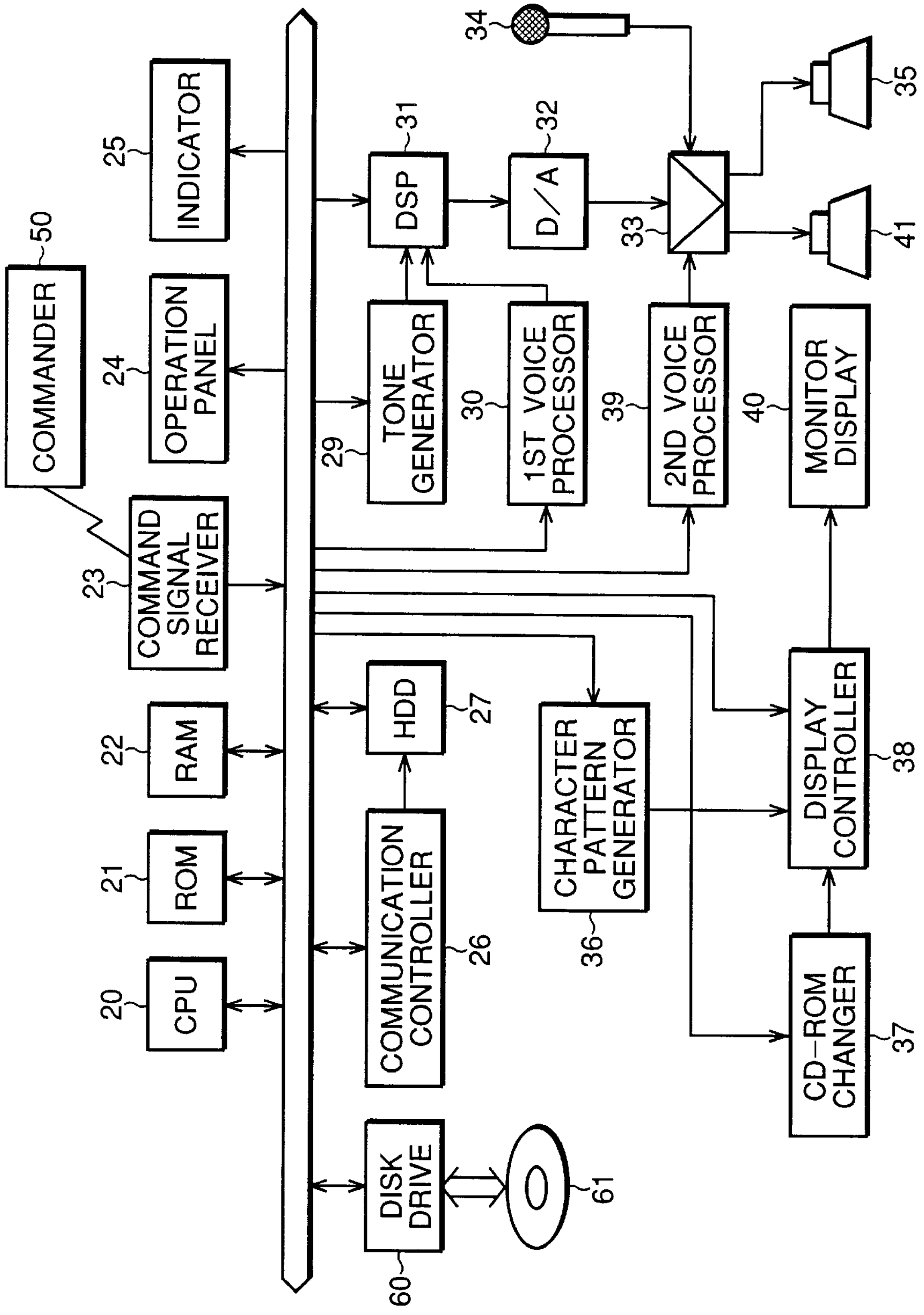

FIG. 1 is a block diagram illustrating constitution of the karaoke apparatus practiced as one preferred embodiment of the invention. FIGS. 2(A), 2(B), and 2(C) show contents of a hard disk drive installed in the karaoke apparatus and formats of speech data stored in the hard disk drive for use in the aural prompt. A CPU (Central Processing Unit) 20 is provided for controlling the operation of the karaoke apparatus in its entirety. The CPU 20 is connected through a bus to a ROM (Read Only Memory) 21, a RAM (Random Access Memory) 22, a hard disk drive (HDD) 27, a communication controller 26, a command signal receiver 23, an operation panel 24, an indicator 25, a tone generator 29, a first voice processor 30, a second voice processor 39, a DSP (Digital Signal Processor) 31, a character pattern generator 36, a CD-ROM changer 37, and a display controller 38. The display controller 38 is connected to the character pattern generator 36, the CD-ROM changer 37, and a monitor display 40.

The ROM 21 stores a program for booting this karaoke apparatus. The hard disk drive 27 stores a system program, a karaoke performance program, a voice guide program, a loader, and character pattern data. The system program controls the basic operation of the karaoke apparatus. The karaoke performance program treats music data and presents a karaoke performance based on the music data. When the karaoke apparatus starts, the karaoke performance program is loaded in the RAM 22 and resides therein. The voice guide program is used to sound words of a karaoke music piece being performed in units of blocks so as to guide a karaoke player along the words by voice. In the karaoke performance, the tone generator 29 is driven to generate music tones of the karaoke performance based on the music data, which is recorded on music tone tracks. Also, voice data included in the music data is reproduced by the voice processor 30 to provide back chorus or else to the karaoke performance. Further, the DSP 31 is controlled based on control data recorded on a DSP control track included in the music data to modify the generated music tone and live singing voice. At the same time, based on word data recorded on a word track and included in the music data, a character pattern of the words is generated by the character pattern generator 36. In addition, based on genre data included in a header of the music data, a predetermined background video is reproduced by the CD-ROM changer 37. The loader is a program for downloading music data and so on from a distribution center. The character pattern is used to visually develop the words and the title given as code information of a karaoke music piece. This character pattern is used when the character pattern generator 36 displays the words based on the word data.

The RAM 22 stores the programs read from the hard disk drive 27. Further, the RAM 22 is provided with a music data loading area in which the music data read from the hard disk drive 27 is loaded for performing a karaoke music piece, and a speech data loading area in which speech data is loaded for prompting the words of the karaoke music piece by speech sounds. The music data and the speech data of one karaoke music piece are stored in the hard disk drive 27 in correspondence with one another as shown in FIG. 2(A).

The communication controller 26 communicates with the distribution center through a communication line to download music data and speech data from the distribution center. The communication controller 26 incorporates a DMA (Direct Memory Access) circuit through which the downloaded music data and speech data can be directly written to the hard disk drive 27 without routing these data through the CPU 20.

A remote commander 50 outputs an infrared code signal generated from an infrared light emitter when command keys of the remote commander 50 are operated. The command signal receiver 23 receives this infrared code signal, restores the same into its original message, and transmits the restored message or command to the CPU 20. Receiving this command, the CPU 20 executes data processing accordingly. The operation panel 24 is arranged on a front face of the karaoke apparatus, and has a keypad generally similar to that provided on the remote commander 50. The indicator 25 is also arranged on the front face of the karaoke apparatus. The indicator 25 includes an LED (Light Emitting Diode) matrix for displaying a code of a karaoke song in performance and a number of reserved or requested karaoke songs.

The tone generator 29 forms a music tone signal based on music tone data included in the music data. The first voice processor 30 reproduces a voice signal of the back chorus or background vocal according to voice data included in the music data. The music tone signal formed by the tone generator 29 and the voice signal reproduced by the first voice processor 30 are inputted in the DSP 31. The DSP 31 imparts sound effects such as reverberation and echo for example to these tone signal and voice signal. The type of an effect to be created and the degree or depth of the effect are controlled based on the DSP control data included in the music data. The music tone signal and voice signal imparted with the sound effect are converted by a D/A converter 33 into an analog signal which represents an automatic accompaniment of the karaoke performance, and which is inputted in an amplifier 33. A live singing voice is also inputted in the amplifier 33 from a microphone 34. The amplifier 33 mixes the karaoke accompaniment and the singing voice, amplifies the mixed result, and drives a loudspeaker 35 and a monitor speaker 41. The monitor speaker 41 is directed toward the karaoke player. The monitor speaker 41 outputs speech sound of the words generated by the second voice processor 39 separately from this karaoke accompaniment.

The second voice processor 39 receives the speech data to aurally reproduce the words. When the voice guide mode is turned on, the speech data is inputted in this second voice processor 39 concurrently with the performance of a karaoke music piece based on the music data. Based on this speech data, the second voice processor 39 sounds or speaks the words of the karaoke music piece. The speech sounds representing the words are inputted in the amplifier 33. The sounding of the words is made on a block by block basis in advance of each singing timing in the karaoke music piece. The speech sounds are outputted only from the monitor speaker 41 through the amplifer 33.

When a karaoke performance starts, the character pattern generator 36 converts the character code data of the word track included in the music data into a character pattern. The CD-ROM changer 37 reproduces a motion picture of background video. The character pattern developed by the character pattern generator 36 and the background video reproduced by the CD-ROM changer 37 are inputted in the display controller 38 to be displayed on the monitor display 40.

The following describes the format of the speech data with reference to FIG. 2(B). The speech data is obtained by dividing words of a karaoke music piece into a plurality of units or blocks, each block being provided with time information, phoneme count, and phoneme information corresponding to the character pattern of the words. Each block is constituted in units of word or phrase. The time information denotes a block interval time (from the beginning of a block to the end thereof. This time information may be written in any adequate formats. For example, if the time information is represented in a value of a clock count for controlling the tempo of the karaoke performance rather than a real time, the karaoke apparatus can cope with change of the tempo of the karaoke performance. The phoneme count indicates the number of phonemes to be pronounced in one block. The number of phonemes includes a phrase code as well as regular phonemes. The phrase code denotes a code for indicating the end or pause of the phrase. If words in two or more blocks are linked to be pronounced together, the linking is made such that it does not go beyond this phrase code to thereby prevent the joint between words from getting unnatural. The phoneme information indicates the speech sounds of the words that are generated in one block. For this information, waveform data may be stored in the form of PCM (Pulse Code Modulation) for example. Alternatively, various waveform data may be stored in the voice processor 39 of the karaoke apparatus beforehand. The phoneme information may be used as a code for selecting any of the stored waveform data. For example, a pronunciation symbol or kana character code may be used as the code for this selection. In the present embodiment, the word character code is used as the phoneme information.

FIG. 2(C) shows a particular example of the speech data. Words "i ro wa ni o e do chi ri nu ru wo, wa ga yo ta re zo tsu ne na ra mu" are divided into blocks "i ro wa," "ni o e do," "chi ri nu ru wo°" "wa ga yo," "ta re zo," "tsu ne na ra mu°." The mark "°" stands for the phrase code. Moreover, a vacant block having no phoneme is set before the first block "i ro wa." This vacant block indicates an intro interval in which no pronunciation of words is made.

Figure 3A:
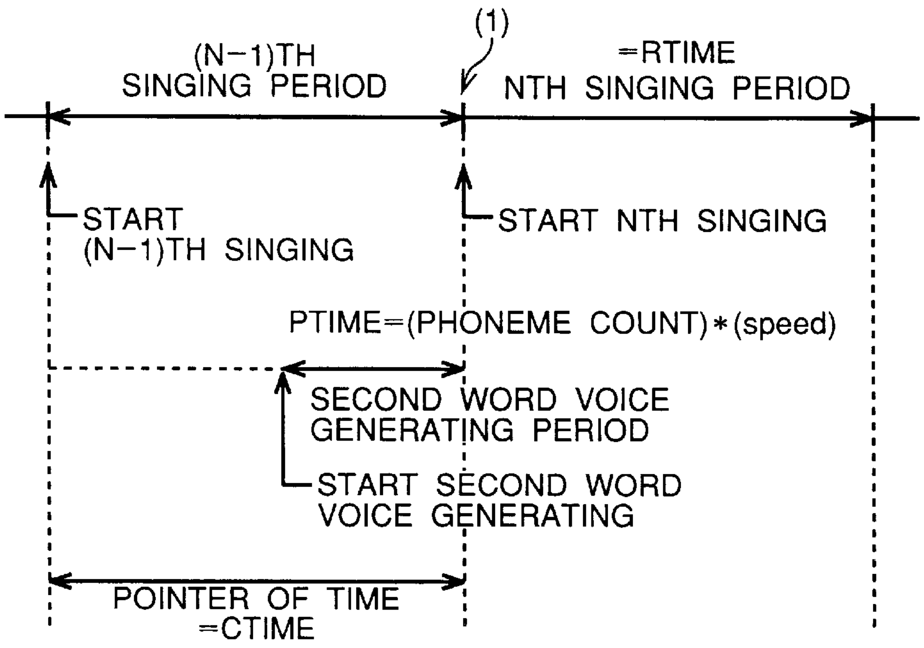
Figure 3B:
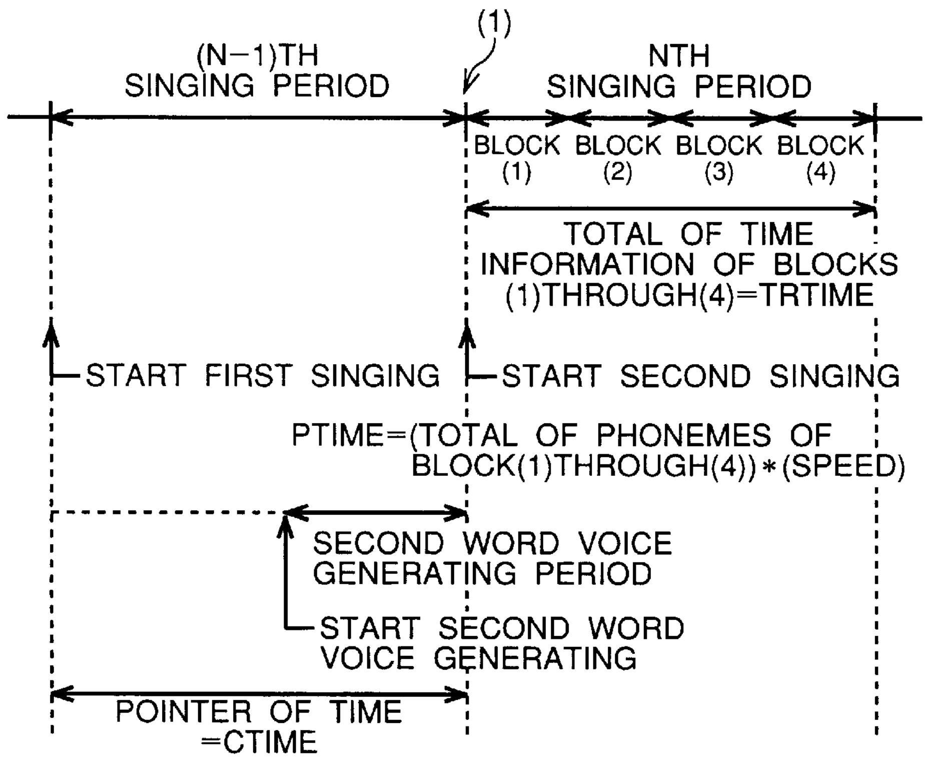

The following describes the operation of the karaoke apparatus associated with the present invention with reference to the timing charts shown in FIGS. 3(A) and 3(B) and the flowcharts shown in FIGS. 4 through 7. It should be noted that FIG. 3(A) shows an example in which one block is pronounced at a time while FIG. 3(B) shows another example in which four blocks are pronounced consecutively.

Figure 4:
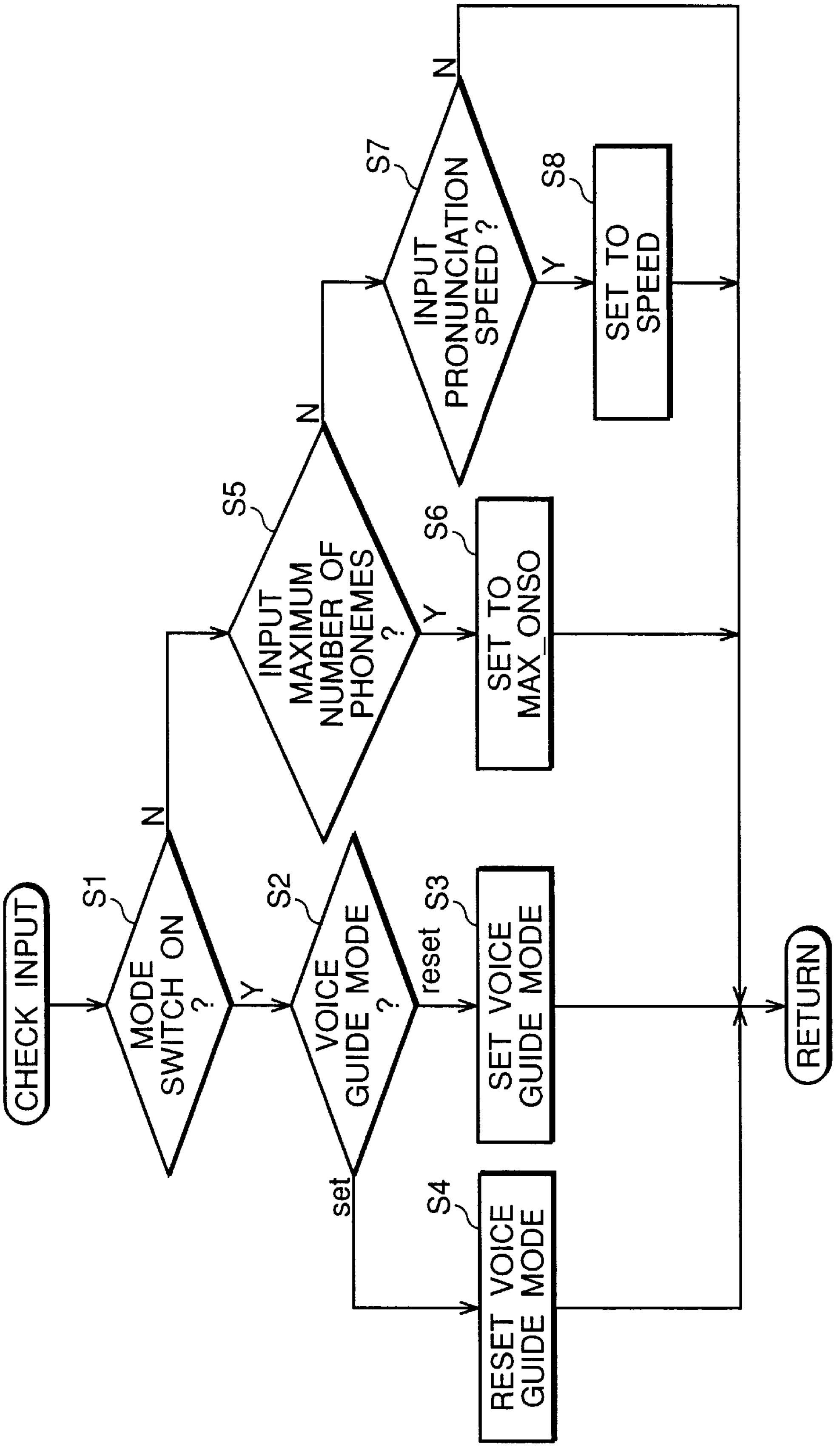
FIG. 4 is a flowchart describing an operation of the above-mentioned preferred embodiment.

FIG. 4 is a flowchart indicative of input check operation to be executed by a user who may be a karaoke player. When the mode select switch is turned on (step s1), determination is made whether the karaoke apparatus is in the voice guide mode or not (step s2). If the karaoke apparatus is not in the voice guide mode, the karaoke apparatus is set to the voice guide mode (step s3). If the karaoke apparatus is already in the voice guide mode, the voice guide mode is reset upon turn-on of the select switch (step s4). If the maximum number of phonemes to be continuously pronounced has been inputted from the numeric key pad (step s5), the maximum number is set to a MAX_ONSO register (step s6). If a pronunciation speed has been inputted from the numeric key pad (step s7), the pronunciation speed is stored in a SPEED register (step s8).

Figure 5:
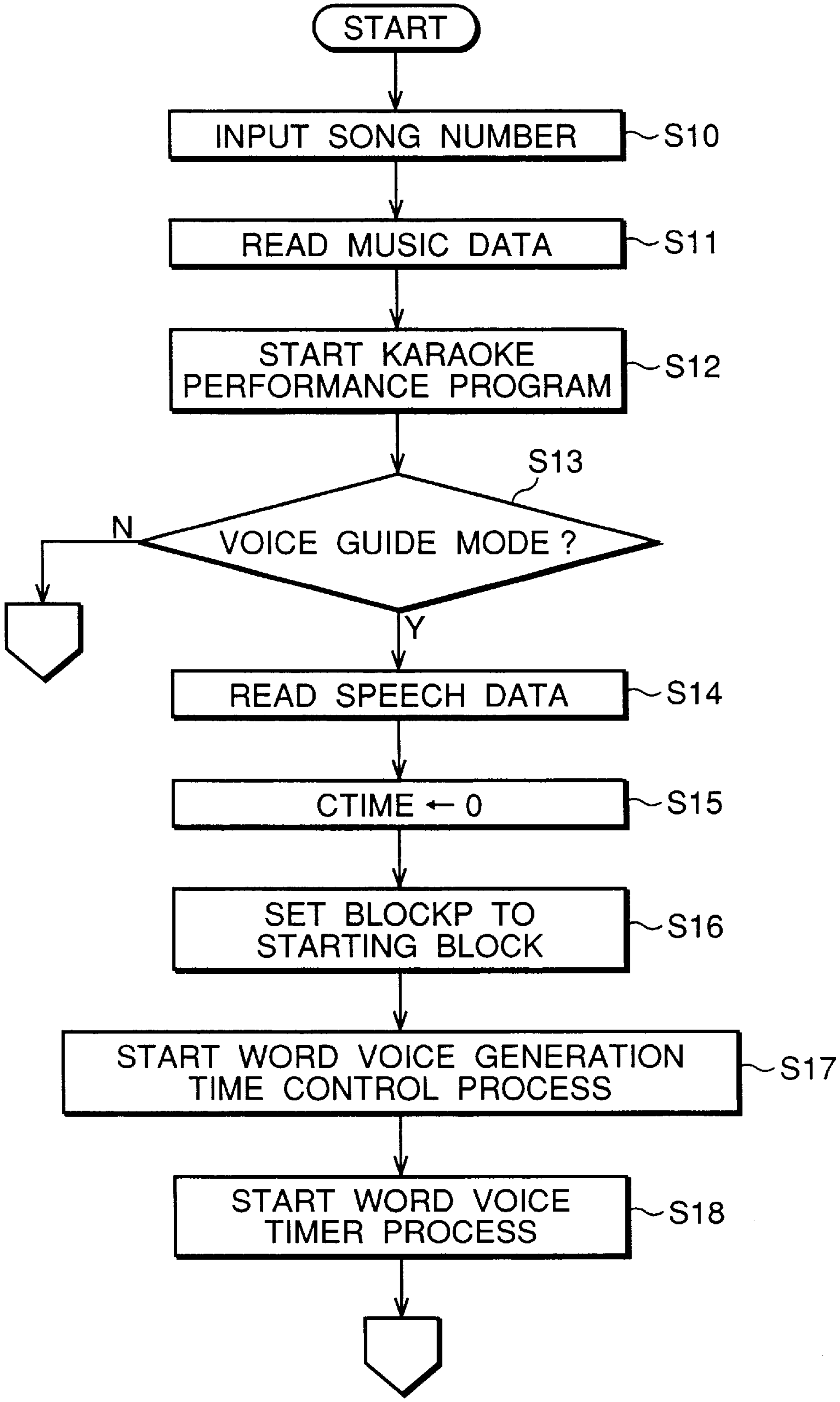
FIG. 5 is a flowchart describing another operation of the above-mentioned preferred embodiment.

FIG. 5 is a flowchart indicative of the performance start process of a karaoke music piece. When a song number is inputted from the remote commander 50 (step s10), music data corresponding to the inputted song number is read (step s11), and the karaoke performance program is started (step s12). This initiates the performance of the specified karaoke music piece, while generating a clock signal in a tempo set by the music data. Next, determination is made whether the voice guide mode is currently set or not (step s13). If the voice guide mode is not set, only the karaoke performance program is executed.

If the voice guide mode is currently set, the speech data of this karaoke music piece is retrieved from the hard disk drive 27 (step s14). Then, a CTIME register for counting a block time during generating speech sounds for prompting the words is reset to 0 (step s15). At the same time, a block pointer BLOCKP for pointing at the block of the speech data is set to the first block (step s16). Thus, the preparatory operation has been completed. Now, the word voice generation time control process is started (step s17), and the word voice timer process is started (step s18). In the word voice timer process, the timer register for this voice guide program is counted by the timer clock during the performance of the karaoke music piece. Therefore, the timer register used in the voice guiding is counted up and down at a speed synchronized with the tempo of the karaoke performance.

Figure 6:
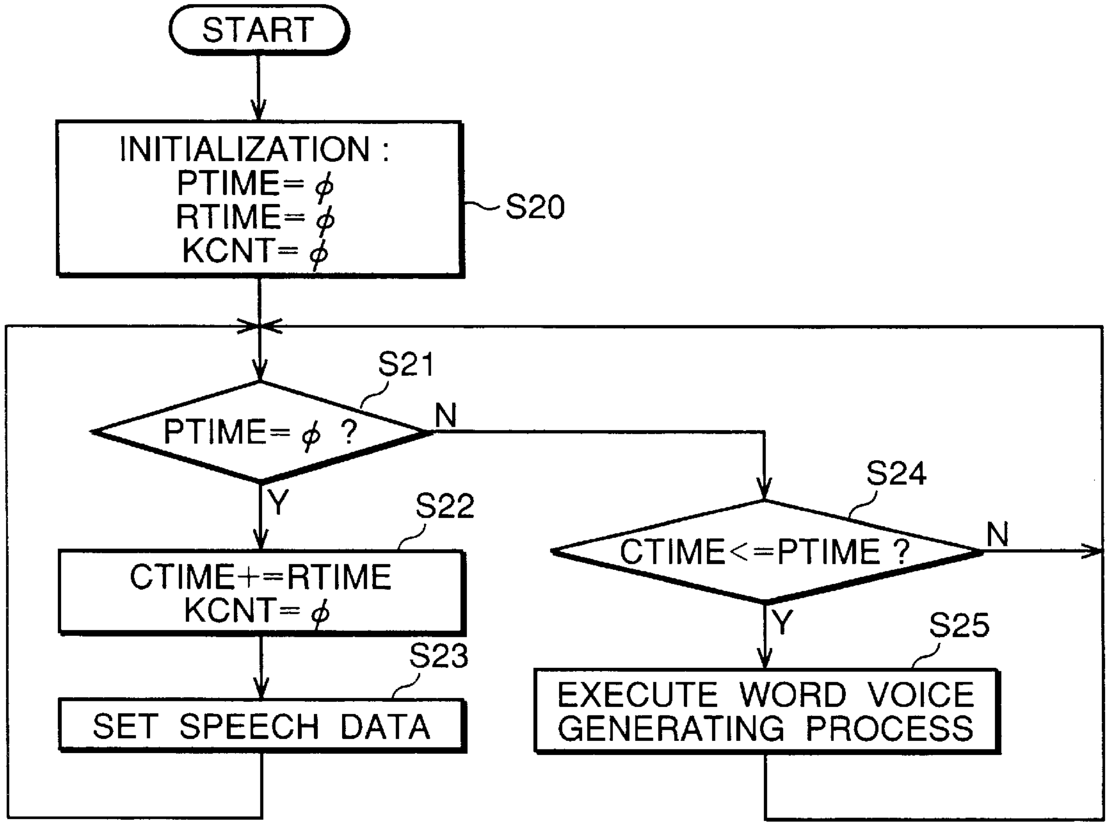
FIG. 6 is a flowchart describing still another operation of the above-mentioned preferred embodiment.

FIG. 6 is a flowchart indicative of the word voice generation time control process. First, for initialization, a PTIME register indicative of a time necessary for pronouncing a train of phonemes at a time is reset to 0. An RTIME register indicative of a time to a next block is reset to 0. A KCNT register indicative of the number of phonemes to be pronounced at a time is reset to 0 (step s20).

Next, determination is made whether PTIME=0; namely whether the last word voice generating process has ended or not (step s21). If PTIME=0, the processing goes to step s22. If PTIME>0 and therefore the word voice generating process or word pronouncing process has not yet ended, the processing goes to step s24, in which the karaoke apparatus waits until next word voice generating process starts. When the song starts and the processing goes to this operation for the first time, PTIME=0. The processing then goes to step s22. Step s22 indicates operation to be executed at time (1) shown in FIGS. 3(A) and 3(B). The interval time RTIME of one or plural blocks with the voice guiding processed in the immediately preceding word voice generating process is substituted into the remaining time CTIME of the current processing, and the KCNT register is reset to 0. Then, in step s23, the phoneme train to be pronounced in the current interval time RTIME is set. That is, as long as conditions such as the time and the separation between phrases permit, a number of phonemes are set to a phoneme buffer KASHIBUF such that words in two or more blocks are linked to be pronounced at a time (refer to FIG. 3(B)).

It should be noted that, in step s23, the phoneme train is set under the conditions that the number of phonemes of the words to be pronounced does not exceed the maximum number of phonemes MAX_ONSO, and pronunciation time PTIME (=the number of phonemes×SPEED) of all phoneme trains does not exceed the remaining time CTIME. However, even if PTIME>CTIME, the words of at least next one block are set to the KASHIBUF to be pronounced. Even if the number of phonemes and the pronunciation time are within the above-mentioned ranges, when the phrase code is read from the block data, the setting ends at this block.

Within the range satisfying the above-mentioned conditions, the following processing operations are executed:

KCNT+=the number of phonemes of block;

PTIME+=time information of block;

KASHIBUF+=phoneme information of block;

PTIME+=the number of phonemes of block×SPEED; and move the BLOCKP to the beginning of the next block.

Subsequently, the karaoke apparatus waits until the remaining time CTIME of the block interval becomes the time PTIME necessary for pronouncing the words (step s24). If this condition is satisfied, the word voice generating process is started (step s25).

Figure 7:
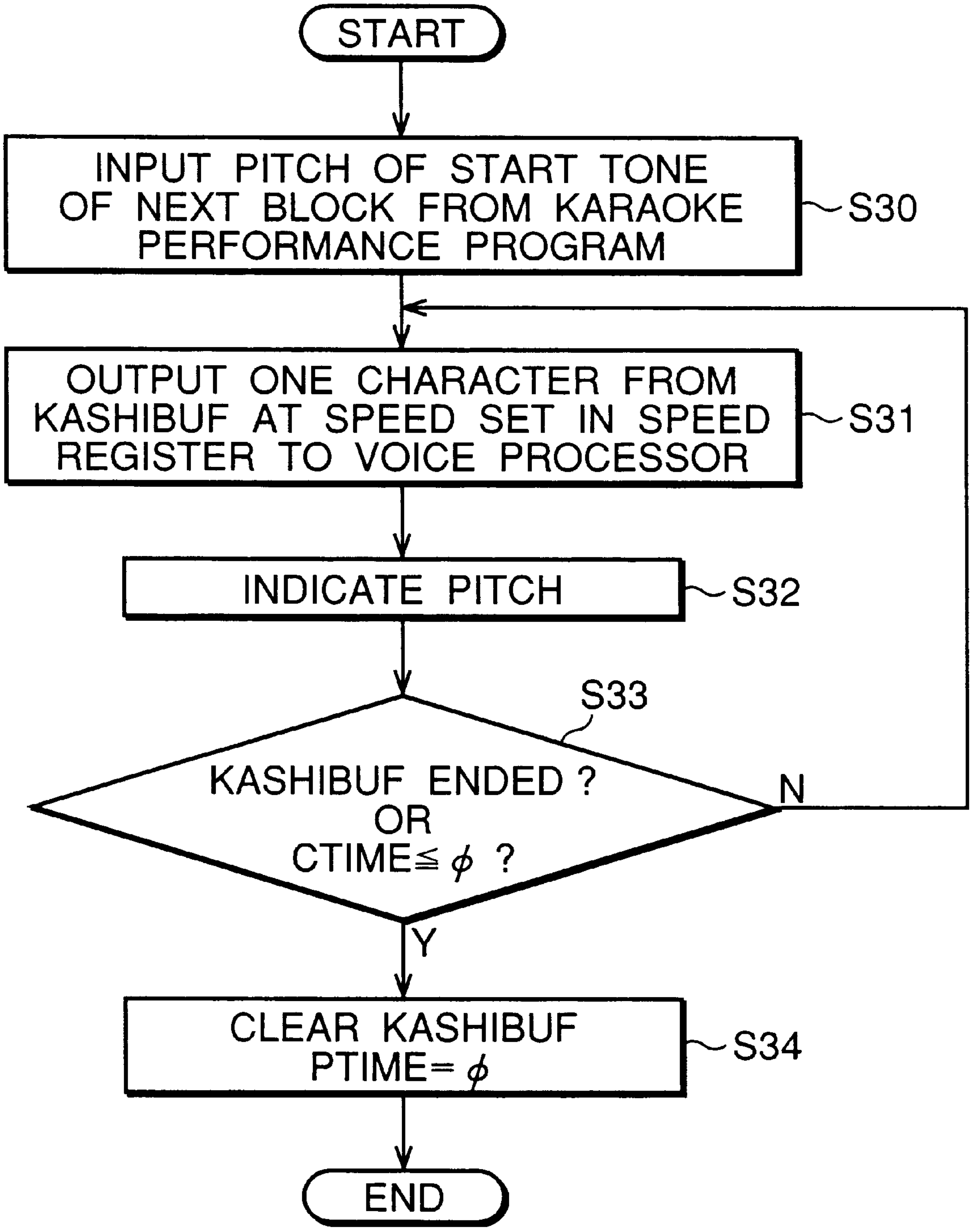
FIG. 7 is a flowchart describing yet another operation of the above-mentioned preferred embodiment.

FIG. 7 is a flowchart indicative of the word voice generating process. First, from the karaoke performance program being concurrently executed, a pitch of the melody of the karaoke music piece at the beginning of a next block is inputted (step s30). Next, the information held in the KASHIBUF is outputted a character by character basis to the voice processor 39 at a speed set to the SPEED (step s31). Then, an instruction is made such that the pitch or frequency of this speech sound is adjusted to the pitch of the above-mentioned karaoke melody which corresponds the pitch of the live singing voice (step s32). This operation is repeated until the phoneme train set to the KASHIBUF ends or the remaining time CTIME becomes 0 (step s33). This word voice generating process is started with PTIME=CTIME as a trigger determined in step s24. As consequence, the phoneme train normally ends at the same time the remaining time CTIME becomes 0. However, even if the pronunciation speed of the words is slow and therefore one block of phoneme data could not be processed, one block of phoneme data is set to the KASHIBUF to start this operation. In such a case, the CTIME may become 0 before the pronunciation of the phoneme train completes. When the determination of step s33 becomes YES, the KASHIBUF is cleared, and the PTIME is reset to 0 (step s34) to end this operation. When this operation ends, the determination of step s21 in the word voice generation time control process shown in FIG. 6 becomes YES, upon which the next phoneme data is set.

In the above-mentioned embodiment, it is assumed that the pronunciation times of the phonemes are equal to each other. It will be apparent that time information of each phoneme (for example, the ratio of pronunciation time of each phoneme to an average phoneme pronunciation time) may be stored to make the robotic pronunciation closer to natural pronunciation.

In the above-mentioned embodiment, the speech data is provided separately from the music data for the conventional karaoke performance. This arrangement eliminates the need for distributing this speech data to those karaoke apparatuses that need not receive this data, thereby preventing an unnecessary increase in communication traffic. Otherwise, this speech data may be included in music data to facilitate file management. Further, rather than providing the speech data separately, the word guiding or aural prompt may be executed by use of the word track data for visual prompt and the guide melody data which is normally used to guide the live singing of the karaoke player. Namely, the words may be pronounced according to the word track data at timings regulated according to the guide melody data.

In the above-mentioned embodiment, the voice guide timing may be related to the rhythm of a karaoke music piece. The starting time of the voice guiding may be related with the rhythm such that the voice guide starts from the last beat of a bar to make the karaoke song easy to listen and sing.

Referring again to FIG. 1, the inventive karaoke apparatus is responsive to a request for producing a karaoke music piece to accompany a live singing performance of words of the karaoke music piece by a karaoke player. In the karaoke apparatus, first memory means is provided in the form of the hard disk drive 27 for memorizing music data representing a plurality of karaoke music pieces. Designating means composed of the operation panel 24 is operative upon a request for designating a karaoke music piece to be performed. Producing means is provided in the form of the tone generator 29 for retrieving the music data corresponding to the designated karaoke music piece from the first memory means so as to generate music tones of the designated karaoke music piece to thereby accompany the live singing performance. Second memory means is provided also in the form of the hard disk drive 27 for memorizing speech data representing speech sounds of words of the karaoke music pieces. Prompting means including the voice processor 39, the monitor speaker 41 and the CPU 20 is cooperative with the producing means for retrieving the speech data corresponding to the designated karaoke music piece from the second memory means so as to produce the speech sounds of the words of the designated karaoke music piece to thereby provide an aural prompt for the live singing performance of the words by the karaoke player.

Preferably, the prompting means includes speed adjustment means for adjusting a speed of production of the speech sounds so as to customize the aural prompt for the karaoke player. Preferably, the prompting means includes break adjustment means for adjusting a number of words that are spoken as a unit without break so as to customize the aural prompt for the karaoke player. Preferably, the prompting means includes timing regulation means for timing the aural prompt in synchronization with a tempo of the produced karaoke music piece. Preferably, the prompting means includes frequency regulation means for regulating a frequency of the speech sounds in matching with a pitch of the live singing performance.

The present invention further covers a machine readable medium 61 such as a floppy disk received by a disk drive 60 of the karaoke apparatus. The medium 61 is provided for use in the karaoke apparatus of FIG. 1 having the CPU 20 and producing a karaoke music piece in response to a request to accompany a live singing performance of words of the karaoke music piece by a karaoke player. The medium 61 contains program instructions executable by the CPU 20 for causing the karaoke apparatus to perform the method comprising the steps of providing music data representing a plurality of karaoke music pieces and speech data representing speech sounds of words of the karaoke music pieces, designating a karaoke music piece to be performed in response to a request, processing the music data corresponding to the designated karaoke music piece so as to generate music tones of the designated karaoke music piece to thereby accompany the live singing performance, and processing the speech data corresponding to the designated karaoke music piece so as to produce the speech sounds of the words of the designated karaoke music piece to thereby aurally prompt the live singing performance of the words by the karaoke player.

As described and according to the invention, the words of a karaoke music piece are sounded to guide a karaoke player along the karaoke accompaniment. This novel constitution allows the blind karaoke players or other karaoke players who cannot use the visual word guidance on a monitor screen to sing karaoke music pieces. In addition, the word pronunciation speed and the number of words to be pronounced at a time are adjusted as desired. Consequently, a karaoke player can be guided along the words in a form best customized to the karaoke player. Further, the word pronunciation timing and the pitch or frequency of the pronounced words can be adjusted to the performance of each karaoke music piece, thereby providing the word guidance that makes karaoke music pieces easier to sing than before.

While the preferred embodiments of the present invention have been described using specific terms, such description is for illustrative purposes only, and it is to be understood that changes and variations may be made without departing from the spirit or scope of the appended claims.

What is claimed is:

1. A karaoke apparatus responsive to a request for producing a karaoke music piece to accompany a live singing performance of words of the karaoke music piece by a karaoke player, the karaoke apparatus comprising:

first memory means for memorizing music data representing a plurality of karaoke music pieces;

designating means operative upon a request for designating a karaoke music piece to be performed;

producing means for retrieving the music data corresponding to the designated karaoke music piece from the first memory means so as to generate music tones of the designated karaoke music piece to thereby accompany the live singing performance;

second memory means for memorizing speech data representing speech sounds of words of the karaoke music pieces; and prompting means cooperative with the producing means for retrieving the speech data corresponding to the designated karaoke music piece from the second memory means so as to produce the speech sounds of the words of the designated karaoke music piece to thereby provide an aural prompt for the live singing performance of the words by the karaoke player.

2. The karaoke apparatus according to claim 1, wherein the prompting means includes speed adjustment means for adjusting a speed of production of the speech sounds so as to customize the aural prompt for the karaoke player.

3. The karaoke apparatus according to claim 1, wherein the prompting means includes break adjustment means for adjusting a number of words that are spoken as a unit without break so as to customize the aural prompt for the karaoke player.

4. The karaoke apparatus according to claim 1, wherein the prompting means includes timing regulation means for timing the aural prompt in synchronization with a tempo of the produced karaoke music piece.

5. The karaoke apparatus according to claim 1, wherein the prompting means includes frequency regulation means for regulating a frequency of the speech sounds in matching with a pitch of the live singing performance.

6. A karaoke apparatus responsive to a request for producing a karaoke music piece to accompany a live singing performance of words of the karaoke music piece by a karaoke player, the karaoke apparatus comprising:

a storage device that stores music data representing a plurality of karaoke music pieces and speech data representing speech sounds of words of the karaoke music pieces;

an operation device that operates upon a request for designating a karaoke music piece to be performed;

a tone generator that retrieves the music data corresponding to the designated karaoke music piece from the storage device so as to generate music tones of the designated karaoke music piece to thereby accompany the live singing performance; and a voice processor that cooperates with the tone generator for retrieving the speech data corresponding to the designated karaoke music piece from the storage device so as to produce the speech sounds of the words of the designated karaoke music piece to thereby provide an aural prompt for the live singing performance of the words by the karaoke player.

7. The karaoke apparatus according to claim 6, wherein the voice processor adjusts a speed of production of the speech sounds so as to customize the aural prompt for the karaoke player.

8. The karaoke apparatus according to claim 6, wherein the voice processor adjusts a number of words that are spoken as a unit without break so as to customize the aural prompt for the karaoke player.

9. The karaoke apparatus according to claim 6, wherein the voice processor regulates timing of the aural prompt in synchronization with a tempo of the produced karaoke music piece.

10. The karaoke apparatus according to claim 6, wherein the voice processor regulates a frequency of the speech sounds in matching with a pitch of the live singing performance.

11. A method of producing a karaoke music piece in response to a request to accompany a live singing performance of words of the karaoke music piece by a karaoke player, the method comprising the steps of:

providing music data representing a plurality of karaoke music pieces and speech data representing speech sounds of words of the karaoke music pieces;

designating a karaoke music piece to be performed in response to a request;

processing the music data corresponding to the designated karaoke music piece as to generate music tones of the designated karaoke music piece to thereby accompany the live singing performance; and processing the speech data corresponding to the designated karaoke music piece so as to produce the speech sounds of the words of the designated karaoke music piece to thereby aurally prompt the live singing performance of the words by the karaoke player.

12. A machine readable medium for use in a karaoke apparatus having a CPU and producing a karaoke music piece in response to a request to accompany a live singing performance of words of the karaoke music piece by a karaoke player, the medium containing program instructions executable by the CPU for causing the karaoke apparatus to perform the method comprising the steps of:

providing music data representing a plurality of karaoke music pieces and speech data representing speech sounds of words of the karaoke music pieces;

designating a karaoke music piece to be performed in response to a request;

processing the music data corresponding to the designated karaoke music piece as to generate music tones of the designated karaoke music piece to thereby accompany the live singing performance; and processing the speech data corresponding to the designated karaoke music piece so as to produce the speech sounds of the words of the designated karaoke music piece to thereby aurally prompt the live singing performance of the words by the karaoke player.

* * * * *